Nov. 17, 1936.  A. MADLÉ  2,060,884

POWER TRANSMISSION MECHANISM

Filed Sept. 19, 1933  2 Sheets-Sheet 1

INVENTOR
Alain Madlé
BY
ATTORNEY

Nov. 17, 1936.  A. MADLÉ  2,060,884

POWER TRANSMISSION MECHANISM

Filed Sept. 19, 1933  2 Sheets-Sheet 2

INVENTOR
Alain Madlé
BY
ATTORNEY

Patented Nov. 17, 1936

2,060,884

UNITED STATES PATENT OFFICE 2,060,884

POWER TRANSMISSION MECHANISM

Alain Madlé, Bristol, Conn., assignor to Erban Operating Corporation, New York, N. Y., a corporation of New York Application September 19, 1933, Serial No. 690,072

13 Claims. (Cl. 74—285)

This invention relates generally to power transmissions of the adhesive contact type, and more specifically to the attainment in such transmissions of a speed reduction by a differential arrangement.

Transmission systems operating by the adhesive contact of races and rolling bodies depend for their effective operation on proper torque loading to supply the pressure necessary to maintain the traction. In attempting to obtain speed reduction by the use of a planetary differential system, in conjunction with an adhesive contact system, the problem of torque loading forcefully presents itself when it is attempted to make the planetary differential system of the adhesive contact type. If it is attempted to make both units self-contained, that is, each with its own individual torque-loading arrangement, structural complications are encountered. If it is attempted to so combine the two transmission devices, that the same axial pressure is employed for both, to give the necessary traction, it is impossible to avoid overloading one of the units in order to provide tractional pressure for the other one.

It is an object of my invention to provide speed reduction by a transmission system of the adhesive type, and a second system of the positively engaging type, such as a geared type, so as to eliminate some of the aforementioned problems. In the specific embodiment herein disclosed, I have illustrated the aforementioned second system as in the form of engaging gears and of planetary type, one of its three members being driven directly from the driving member, and another by the output end of an adhesive contact system, also driven from the driving end.

In order to give the reduction a variability, I have shown the aforementioned adhesive contact driving system as so constructed as to give a variation in speed ratio between the members thereof, and therefore between the input end and the output end.

While my invention has been shown by way of illustration in a specific embodiment, it will be understood that it may assume many other forms, such as will readily suggest themselves to those skilled in the art, and that I do not limit myself in respect thereto in any manner other than as defined in the appended claims.

For the attainment of these objects and such other objects as may hereinafter appear or be pointed out I have illustrated one form of my invention in the drawings, wherein:—

Figure 4 is a sectional view taken on the line 4—4 of Figure 1, looking in the direction of the arrows.

Figure 1:
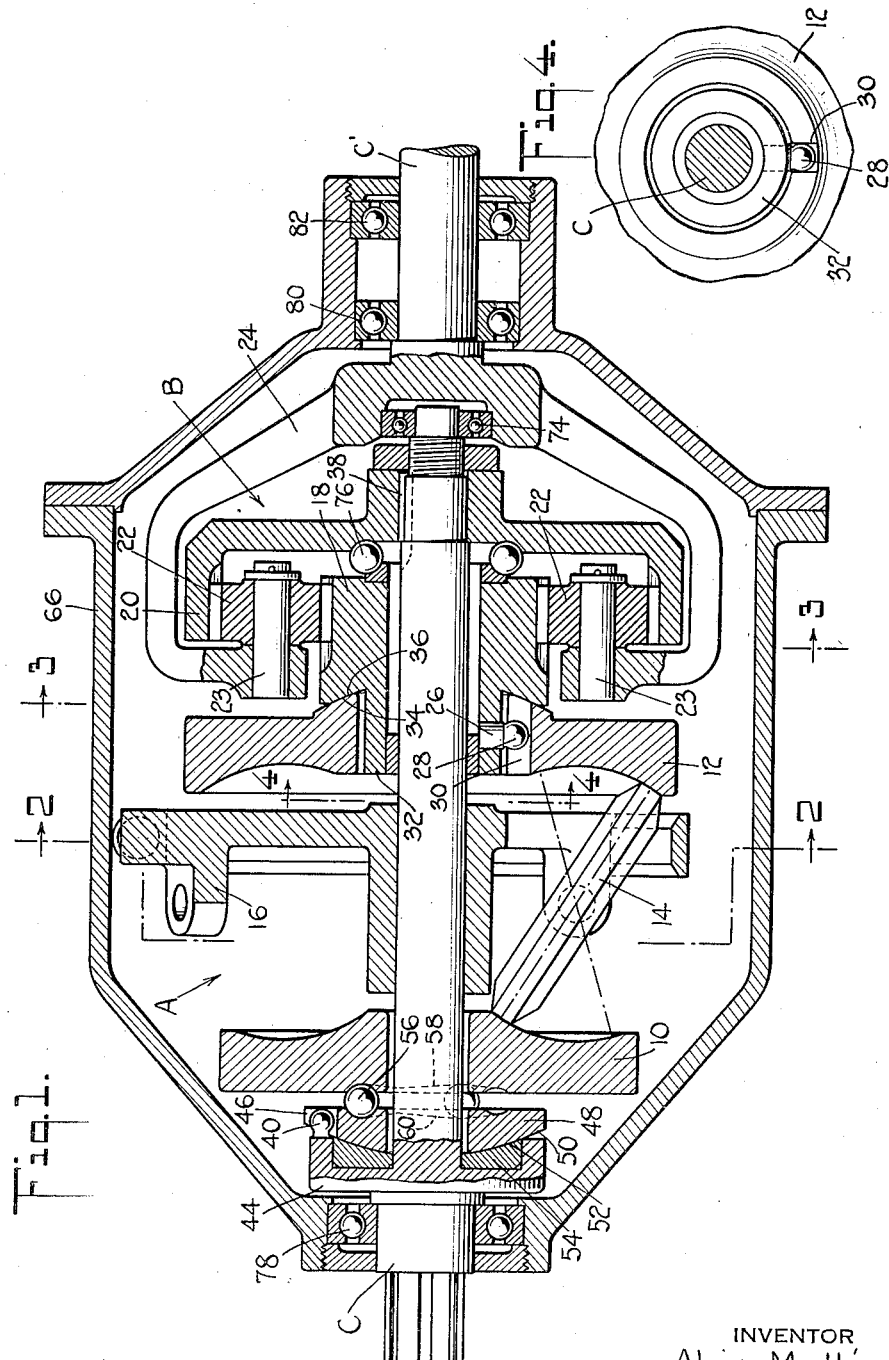
Figure 1 is a longitudinal, sectional view through my improved power transmission.
Figure 2:
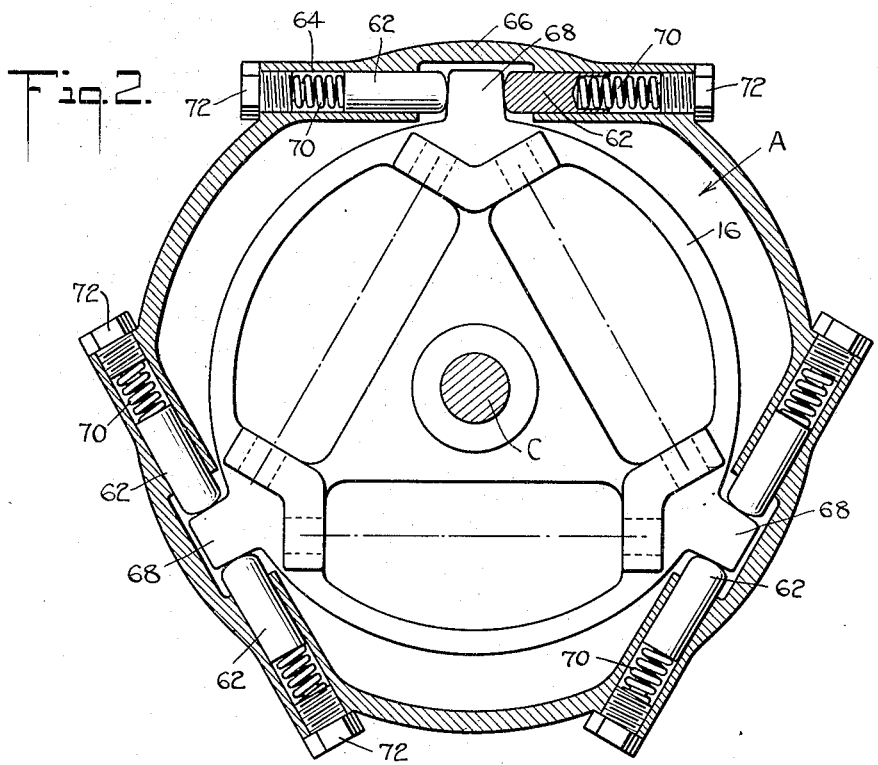
Figure 2 is a sectional view on the line 2—2 of Figure 1, looking in the direction of the arrows.
Figure 3:
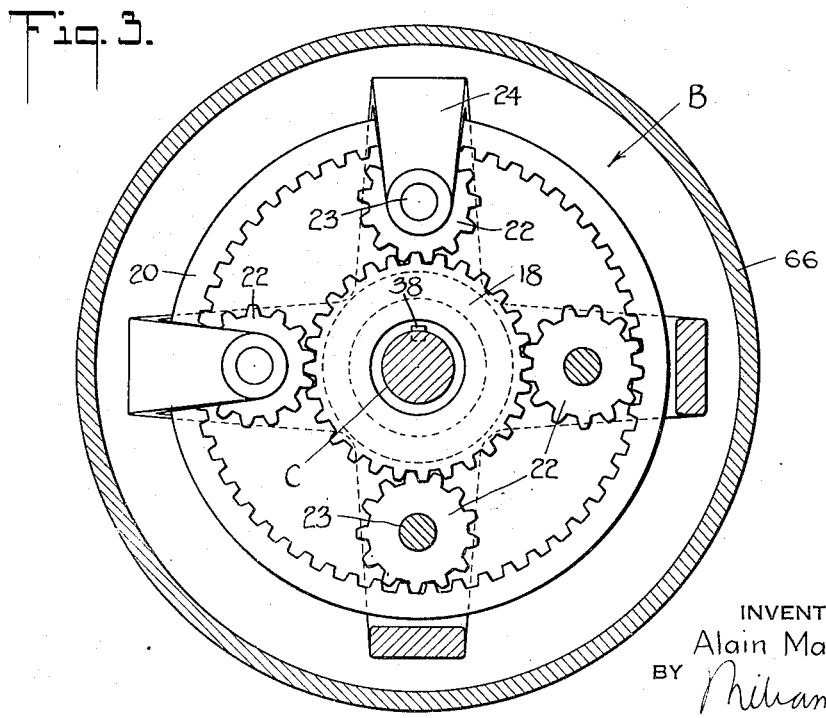
Figure 3 is a transverse, sectional view on the line 3—3 of Figure 1, looking in the direction of the arrows.

Referring now to Figure 1, my transmission is there shown as located intermediate the rotating members C and C', and as serving to transmit power from one to the other. For facilitating the description, it will be assumed that C is the driving member and C' the driven member, although it is to be understood that C' may equally well serve as the driving member, and C as the driven member.

My transmission in its illustrative embodiment, consists in general of a system of races and rolling bodies in adhesive driving contact therewith, and referred to as a whole by the letters A, in conjunction with an epicyclic toothed gear system, denoted as a whole by B.

The system B is of the planetary type, in which the outer and inner members respectively are connected to the driving shaft C, the outer member directly, and the inner member through one of the races of the adhesive system A. The intermediate member of the planetary system B consists of a set of epicyclic gears carried by the driving shaft. The system B constitutes in effect, a differential system in which the torques transmitted through the two driving branches just mentioned are balanced about the pivot of the epicyclic gears, and this pivot is given a velocity which is the average of the velocities of the outer and inner driving members of the gear system.

At the same time the system serves to effect a speed reduction, as will appear later, and the degree of reduction is controllable by adjustment of the system A. In the system as illustrated, reversal of rotation of the driven shaft C' may be readily effected.

The system A is of well known type such for instance as described in the patent to Morison No. 1,817,159, and it will therefore be unnecessary to describe the same in full detail. For the purposes of this description, it will suffice to state that the system embraces a pair of races 10 and 12, each provided with a toric race-way, between which and in adhesive driving contact therewith, is located a set of rollers or rolling bodies 14, carried by a relatively stationary frame 16, which, however, is resiliently mounted as will be presently explained. The planes of rotation of the rollers 14, may be varied in relation to the raceways, (as indicated by the dot and dash line, angularly inclined to the roller 14 in Figure 1), for the purpose of varying the speed ratio of the transmission. Mechanism by which such tilting of the plane of rotation may be effected will be found described in the aforementioned patent, and no attempt will therefore be made herein to describe the same in detail.

The gear system B comprises three main parts, an inner or sun gear 18, an outer gear 20, and a set of epicyclic or planet gears 22, which are arranged to mesh with both gears 18 and 20 and are rotatably mounted on pins 23 carried on the arms of a member 24 carried in fixed relation to the driven shaft C'.

Race 12 and sun gear 18 are constrained to rotate together by the arrangement illustrated in Figures 1 and 4, which comprises a pin 26, having a rounded head 28, and carried by the sun gear 18 and engaging in a groove 30 of the raceway 12. This construction insures a rotation of parts 12 and 18 together, while at the same time it permits adjusting self-aligning movements of the race 12 about the shaft C, which are necessary to secure proper operation of the race and roller system, and which are made possible by the provision in the race 12 of a central aperture great enough to permit lateral play of the race with relation to the hub 32 of sun gear 18, about which it is shown disposed, and also by the provision of the spherical surface 34 on the raceway, which is seated on a complementary spherical surface 36 disposed on the sun gear 18.

The outer gear 20 of the system B is carried in fixed relation to the driving shaft C, which extends inwardly a sufficient distance for this purpose, and this fixed relation is indicated in Figure 1 by the key 38. The race 10 has a driving connection with a driving shaft C through an arrangement similar to the one just described and illustrated in Figure 4, and through a "torque-loading" device. This arrangement embraces a rounded element or knob 40 carried by an extension 44 of the driving shaft C and engaging a slot 46 in a member 48 which member is provided with a spherical surface 50 in engagement with a complementary spherical surface 52 provided on a thrust block 54, intermediate said member 48 and the extension 44 of the shaft hereinbefore referred to. Due to this construction, and to the fact that the member 48 is provided with a central aperture large enough to give it freedom of play about the shaft C, the member 48 is free to adjust itself in relation to the shaft C.

A driving connection between race 10 and member 48 is established by a set of rolling bodies, such as balls 56, located in contact with inclined surfaces 58 and 60 provided on the race and on the member 48 respectively. The function of this system of balls and inclined surfaces is to generate an axial pressure in the system of races and rolling bodies, which will be in general proportional to the torque transmitted through them, and which will serve to keep the races and rolling bodies in adhesive contact, this being a necessary condition to their proper functioning. The construction described effects this function by the tendency of the balls to run up the inclined surfaces whenever relative rotation takes place between race 10 and member 48, whereby the race 10 is caused to move axially and to exert pressure on the rollers 14. The construction just described is generally known as a torque-loading device. It is further to be noted that the race 10 is adapted to adjust itself laterally and angularly by the enlarged central aperture 60 provided within it, which permits shaft C to pass freely therethrough.

It will therefore be observed that power transmitted by the driving shaft C is divided into two portions, one of which passes through the member 48, and its associated torque-loading device, into the race 10, and therefrom through the rollers 14 into the race 12, from which it passes into the sun gear 18, and through the planetary gears 22 into the driving shaft C'. The other portion passes from the shaft C directly into the outer gear 20 and therefrom into the planetary gears 22 and into the driven shaft C'.

To make the action of the system B clear, we may assume the case of the driving shaft C rotating in a clockwise direction. The race 10 will then also rotate in a clockwise direction as will the outer gear 20 of the system B. Race 12 of system A will rotate in a counter-clockwise direction, and so will the inner gear 18. If the actual peripheral velocities of the teeth of 20 and 18 are the same, the pins 23 will remain stationary, as will the driven shaft C' which carries them. Such zero position of the driven shaft is attainable by suitable design of the race and roller system, but is not necessary to the functioning of my invention, which may take a form in which there is no such zero position; but in which the driven shaft will be caused to rotate at various speeds but always in the same direction.

If now by adjusting the transmission ratio of system A, and without changing the speed of shaft C' and gear 20, gear 18 is speeded up, the pins 23 will commence to move about the axis of driven shaft C' in a counter-clockwise direction. If, on the other hand, the transmission A is adjusted so as to slow down the gear 18, the pins 23 will carry the shaft C' in a clockwise direction.

It is to be understood that various refinements of mechanical construction may be added to improve the efficiency of my construction. One of such features is the provision of a resilient support for the roller frame 16, by plugs 62, slidable within bores 64 in the housing or casing 66, which may be conveniently disposed about the entire mechanism. These plugs are located one on each side of extensions 68 of the frame 16, and are pressed thereagainst by springs 70 located within the aforementioned bores. Suitable means for retaining the springs 70 within the bores 64 may be provided in any preferred form, such as screw plugs 72. The inner end of shaft C may be conveniently journaled in the ball bearings 74 within a hollow provided in member 24, and the ball bearing 76 is conveniently applied between the sun gear 18 and the outer gear 20 to take up the axial thrust generated by the torque-loading member. The shafts C and C' are also conveniently journaled in suitable ball bearings, such as are indicated at 78 for the driving shaft and 80 and 82 for the driven shaft.

Having thus described my invention and illustrated its use, what I claim as new and desire to secure for Letters Patent is—

1. In power transmission mechanism for transmitting power from a rotating driving member to a rotatable driven member, a variable speed race and roller system comprising a driving race and a driven race and rollers in adhesive driving relation thereto so as to transmit power between said races, said races being mounted on one of said members in axial alignment, and coaxially with said member, a differential system comprising an outer gear of relatively greater diameter and an inner sun gear of relatively lesser diameter and a set of planetary gears in operative engagement with said gears and positioned therebetween, said system also being positioned on said last-mentioned member in coaxial relation thereto, the inner gear of said planetary system being operatively connected to one of said races, and the outer gear being in direct driven relation with said last-mentioned member, and said planetary gears being rotatably mounted on a carrier element in driving relation with the other of said members, whereby at high ratios of transmission the preponderance of power will pass through the outer gear of the transmission.

2. Power transmission mechanism for transmitting power from a rotating driving member to a rotatable driven member, a race and roller system comprising a toric driving race and a toric driven race and rollers, the axes of rotation of which are adjustable for purposes of speed variation, in adhesive driving relation to said races so as to transmit power between said races, said races being mounted on one of said members coaxially thereto, a differential system comprising an outer gear of relatively greater diameter and an inner gear of relatively lesser diameter, and a set of planetary gears in engagement with said gears, and positioned therebetween, said system also being positioned on said last-mentioned member, in coaxial relation thereto, the inner gear of said planetary system being operatively connected to one of said races, and the outer gear being in direct driven relation with said member, and said planetary gears being mounted on a carrier element in driving relation with the other of said members, whereby at high ratios of trasmission the preponderance of power will pass through the outer gear of the transmission.

3. In combination with mechanism as defined in claim 2, means for generating an axial pressure proportional to the transmitted torque, intended to insure adhesive contact of the rollers with the races.

4. In combination with mechanism as defined in claim 2, means for generating an axial pressure proportional to the transmitted torque, intended to insure adhesive contact of the rollers with the races, said means being interposed between the member carrying the outer gear and the other of said races so as to establish a drive connection therebetween.

5. Mechanism as defined in claim 2, in which the races are mounted so as to be laterally movable in relation to the member on which they are mounted, for purposes of self-alignment.

6. Mechanism as defined in claim 2, in which the races are mounted so as to be laterally and angularly movable in relation to the member on which they are mounted, for purposes of self-alignment.

7. Mechanism as defined in claim 2, in which the inner gear is provided with a concave spherical surface and the race operatively connected therewith is provided with a complementary spherical surface seating on said concave surface, and being adapted for lateral movement in relation to the member it is mounted on, whereby it may move angularly in relation to said member for purposes of self-alignment.

8. Mechanism as defined in claim 2, in which the other race is adapted to be locked to a seating means provided with a convex spherical bearing surface seating on a complementary surface carried by the race and roller carrying member whereby said race may move angularly in relation to said member for purposes of self-alignment.

9. In combination, a driving member and a driven member, and means for transmitting torques from one to the other comprising a driving race, a driven race and rollers in adhesive driving relation to said races so as to transmit power between said races and adjustable for purposes of speed variation, said races being mounted coaxially, means for generating an axial pressure proportional to the transmitted torque adapted to insure an adhesive contact of the rollers with the races, a differential system comprising an outer gear of relatively greater diameter and an inner gear of relatively less diameter and planetary gears in engagement with said first mentioned gears, and positioned therebetween, said system also being positioned in coaxial relation to the races of the first mentioned system, the inner gear of said planetary system being operatively connected to one of said races and the outer gear being in direct driving relation to one of said members, and said planetary gears being mounted on a carrier element in driving relation to the other of said elements whereby at increasing ratios of transmission at which the speed of the planetary carrier element increases, the preponderance of power imposed on the outer gear of the transmission will also increase.

10. In a power transmission system, a toric driving race, and a toric driven race coaxial therewith, rollers therebetween and in adhesive driving contact therewith for transmitting power from one to the other, a frame for carrying said rollers mounted in coaxial relation to the said races and free for angular movement about the axis of the races so as to yield to sudden shocks, means independent of any movement of the carriage for varying the ratio of transmission and resilient elements in opposed relationship to the frame for yieldingly resisting and for positively limiting the degree of angular displacement of the frame and balanced so as to cause the frame to return to a normal position of equilibrium when it moves therefrom due to the impact of a shock.

11. In a power transmission system for transmitting power from a driving shaft to a driven shaft, a toric race and roller system comprising toric races coaxial with each other and rollers therebetween and in adhesive contact therewith for transmitting power between said races, torque loading means adapted to generate axial pressure in response to the torque transmitted, for maintaining adhesive contact between the rollers and the races, a planetary system in coaxial relation to the races in the first mentioned system, one member of the planetary system and one of the races being in driving relation to one of the shafts, and the planetary carrier element being in driving relation to the other of said shafts, and a thrust bearing interposed between two of said members of the planetary system and adapted to absorb the thrusts transmitted from the torque loading means to the said first mentioned member of the planetary system in said driving relation to said one of the shafts.

12. In a power transmission system for transmitting power from a driving to a driven shaft, a toric race and roller system comprising toric races coaxial with one of said shafts and carried thereby and rollers therebetween and in adhesive contact therewith for transmitting power between said races, a planetary system having the planetary carrier element thereof in direct driving relation to the driven shaft, one of its other members directly driven by one of said races and another member fixed to the shaft, torque loading means adapted to generate axial pressure in response to the torque transmitted for maintaining adhesive contact of the rollers with the races and a thrust bearing interposed between the said two members of the planetary system and adapted to absorb the thrusts transmitted from the torque loading means through the member of the planetary system connected to the race.

13. In a power transmission system for transmitting power from a driving to a driven shaft, a toric race and roller system comprising toric races coaxial with one of said shafts and carried thereby, and rollers therebetween and in adhesive contact therewith for transmitting power between said races, a planetary system also carried by said shaft and having its outer member fixed to the shaft, and its inner member positioned between its outer member and the toric system, torque loading means adapted to generate axial pressure in response to the torque transmitted for maintaining adhesive contact of the rollers with the races, and a thrust bearing interposed between the inner and the outer member of the planetary system and adapted to absorb the thrusts transmitted from the torque loading means through the inner member.

ALAIN MADLÉ.